N. Du BRUL.
TREADLE MOVEMENT.
No. 189,926.                                    Patented April 24, 1877.
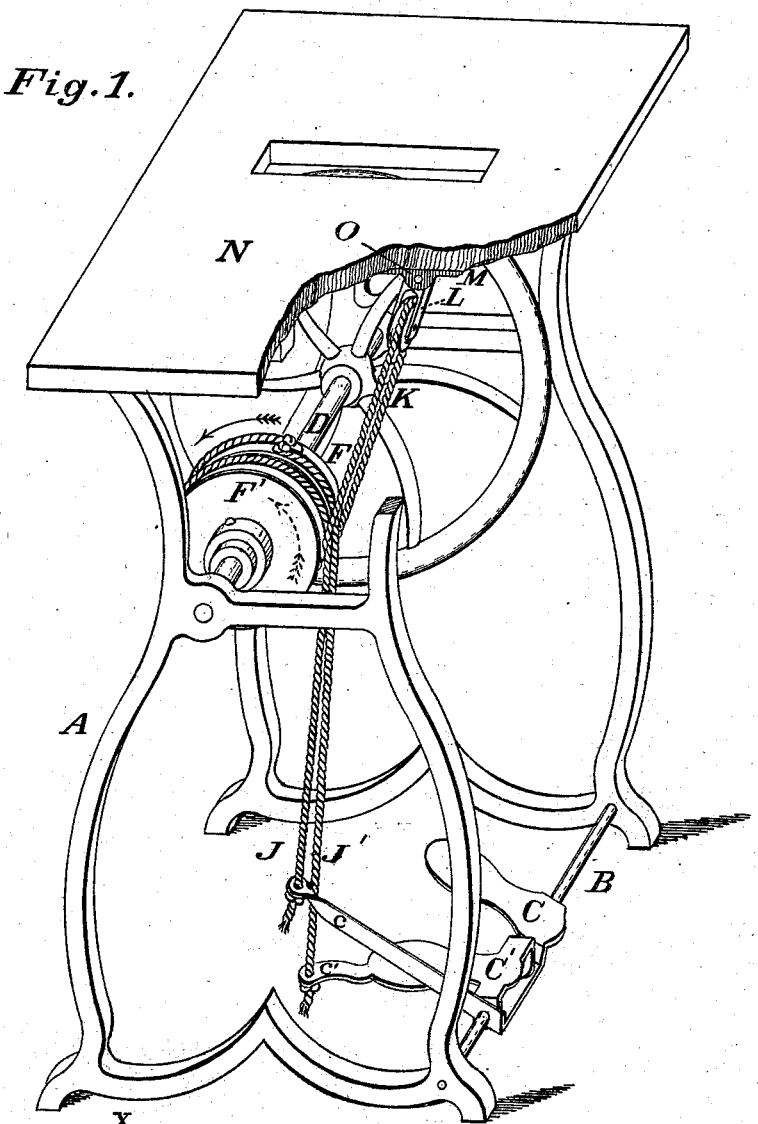
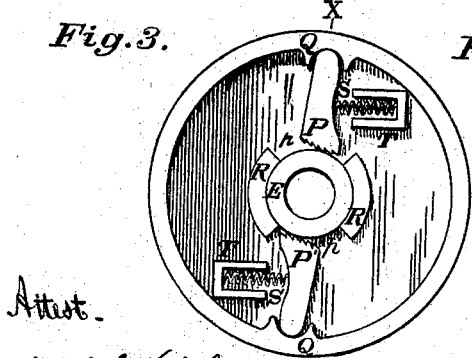
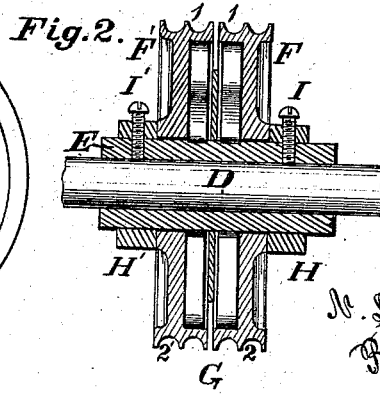
Attest.
Harry S. Knight
Walter Knight
N. DuBrul
By Knight Bros.
Attorneys.

ately-acting treadles, substantially identical with
UNITED STATES PATENT OFFICE.

NAPOLEON DU BRUL, OF CINCINNATI, OHIO.

IMPROVEMENT IN TREADLE-MOVEMENTS.

Specification forming part of Letters Patent No. 189,926, dated April 24, 1877; application filed February 2, 1877.

*To all whom it may concern:*

Be it known that I, NAPOLEON DU BRUL, of Cincinnati, Hamilton county, Ohio, have invented a new and useful Improvement in Treadle-Movements, of which the following is a specification:

My invention relates to a mechanical device, whereby the action of two oppositely-vibrated treadles is made effective to impart a continuous and forward rotary motion to a shaft.

In the accompanying drawing, Figure 1 is a perspective view of a sewing-machine-driving mechanism embodying my invention. Fig. 2 is an axial section at the line $x\ x$ of my pair of friction clutch-wheels on a larger scale. Fig. 3 is an inner face view of one of my friction clutch-wheels on same scale as Fig. 2.

A may represent any customary sewing-machine stand, and B may represent a treadle-shaft. C C' may represent a pair of oppositely-acting treadles, substantially identical with those shown in Patent No. 146,994, granted to myself and Cyriac Du Brul, February 3, 1874; and D may represent a pulley-shaft. E is a hub or shell upon said shaft, upon which freely rotate two precisely-similar wheels or pulleys, F F', separated slightly from each other by means of a disk or circular plate, G, and retained to their proper place upon the hub by means of collars H H', which are held fast to the hub by means of set-screws I I'. The periphery of each pulley has two grooves, of which those in the pulley F are marked, respectively, 1 and 2, and those in pulley F' are marked, respectively, 1' and 2'. Secured within the grooves 1 and 1' are cords or thongs J and J', which communicate, respectively, with arms $c\ c'$, that project from the treadles C C', respectively, while the grooves 2 and 2' have secured within them the ends of a cord or thong, K, whose middle portion or bight is rove around a sheave or idler, L, which is journaled in a hanger, M, which is suspended from the under side of table N by means of trunnions O, so as to be self-adjustable to any angle, forward or backward, that the cord may assume in operation, or to which it may be shifted in different machines.

Each pulley F and F' contains interiorly two friction-pawls, P and P', having eccentric peripheries $p\ p'$ of hard tempered steel, scored or roughened, as represented, so as to bind or gripe securely upon the periphery of the hub E, which, with this object in view, is composed of soft iron, brass, or other metal of less hardness than that which composes the operative parts of the said pawls. Each pawl is confined in a socket, Q, and cheeks R of somewhat greater depth than the pawls, and each pawl is held to its place upon the hub-surface by a helical or other suitable spring, S, operating by thrust or pressure.

The circular plate or disk G, interposed between the two pulleys F and F', keeps the pawls in place, and prevents any collision of the pawls and cheeks of one pulley with those of the other pulley.

The projection from the interior wall of the pulley of the cheeks R, being slightly in excess of the thickness of the pawls, prevents any pressure of the separating-plate G thereupon, and leaves the pawls free to operate.

The helical springs S are held in place by means of suitable pockets T.

It will be seen that the outer rims of the wheels or pulleys F F' are made effective as abutments for the heels or pivots of the pawls P P'.

The operation of my device is as follows:

A depression of the treadle C causes the pulley F to revolve in the direction indicated by strong arrow, and, in so doing, to bring its pawls to bear upon the hub E, so as to rotate the shaft D forward. This is accompanied by an ascent of treadle C' and a retrograde rotation of pulley F'.

On reversing the treadle-action, the pulley F' is, in turn, impelled forward, so as to assume effective action. (See dotted arrow, the pulley F' now receding.) Thus each pulley F and F' becomes, by turns, effective to produce and maintain a continually-forward rotation of the shaft D, the (for the time being) operative pulley being also effective as a counter-check, to render impossible any reverse movement of the shaft from contact with the (for the time being) receding pulley. It will thus be seen that it is impossible for a shaft thus provided to be driven the wrong way.

The present illustration shows a sewing-machine-driving mechanism whose pulley-shaft is rotated away from the operator; but it is manifest that, by reversing the pawl-wheels or pulleys F F', the device may be made equally effective for a machine whose shaft rotates toward the operator.

The provision of arms $c\ c'$, having any desired lateral position relatively to the treadles, enables the pawl-wheels and the treadles to have any relative location in the machine.

The hub E, being straight, enables the pawl-wheels and their confining-collars to be located at any desired part of the hub's length.

My invention is here illustrated as applied to a machine whose belt-pulley is attached to a revolving shaft; but the device may, manifestly, be adapted to any particular machine—for example, to one whose belt-pulley revolves upon a fixed stud, the hub E being attached, by any suitable means, to such pulley, so as to revolve therewith upon the stud.

I claim as new and of my invention—

In combination with the pair of alternately-acting treadles C C' and the thongs or cords J J' K and idler L, the pair of wheels or pulleys F F', each provided with eccentric pawls P P', occupying sockets Q and cheeks R, which operative parts in each wheel are separated from those in the other wheel or pulley by the annular plate G, as and for the purposes set forth.

In testimony of which invention I hereunto set my hand.

NAPOLEON DU BRUL.

Attest:
  GEO H. KNIGHT,
  L. H. BOND.